US006760964B1

(12) United States Patent
Gartner

(10) Patent No.: US 6,760,964 B1
(45) Date of Patent: Jul. 13, 2004

(54) KEY PAD ASSEMBLY AND METHOD OF ASSEMBLING

(75) Inventor: Klaus W. Gartner, Palos Verdes Estates, CA (US)

(73) Assignee: U-Code, Inc., Torrance, CA (US)

( * ) Notice: Subject to any disclaimer, the term of this patent is extended or adjusted under 35 U.S.C. 154(b) by 0 days.

(21) Appl. No.: 09/564,133

(22) Filed: May 3, 2000

(51) Int. Cl.[7] ............................ B23P 11/00; B23Q 3/00; B60R 25/02

(52) U.S. Cl. ......................... 29/525.01; 29/464; 70/214

(58) Field of Search ............................. 29/525.01, 428, 29/464, 592; 70/278, 416, 214; 235/1 D, 93, 145 R; 340/20, 22; 361/730; 439/426, 493

(56) References Cited

U.S. PATENT DOCUMENTS 4,581,495 A * 4/1986 Geri et al. .................. 179/179
4,887,445 A * 12/1989 Beatty ......................... 70/278
5,160,812 A * 11/1992 Takahashi et al. .......... 174/135
5,473,922 A * 12/1995 Bair et al. .................... 70/416
5,637,417 A * 6/1997 Engmark et al. ............. 429/97
6,285,159 B1 * 9/2001 Ki et al. ...................... 320/112

* cited by examiner

*Primary Examiner*—John C. Hong
(74) *Attorney, Agent, or Firm*—Oppenheimer, Wolff & Donnelly LLP

(57) ABSTRACT

The key pad assembly includes a housing that attaches to a secure container. The housing has a front wall, and a key pad attaches to the front face of the front wall. A cylindrical side wall extends back from the front wall. The side wall is truncated at an angle to angle the front face to the door. Where the side wall is widest, which should be at the bottom of the housing, the side wall has a removable section through which a battery can be inserted. A cable extends through an opening in the front face from the key pad to a circuit board that mounts the combination sensing circuit. The cable is flat with multiple electric conductors and a slot. When the key pad and circuit board are properly assembled, the cable slot fits over a fixed pin in the housing. The pin secures the cable so that it is not pulled from its connection with the key pad or the circuit board. Other pins within the housing mount the circuit board. Parallel walls from the rear of the front face create a cavity for the battery. The side walls that create a battery chamber each has a shaft with an opening that extends through the front wall. The shafts supply support for bolts attaching the housing to the secure container. When the key pad is attached to the housing, the pad covers the openings.

8 Claims, 3 Drawing Sheets

KEY PAD ASSEMBLY AND METHOD OF ASSEMBLING

BACKGROUND OF THE INVENTION

1. Field of the Invention

The present invention relates to key pad assemblies, primarily for safes and other secure containers.

2. General Background and State of the Art

Safes and other secure containers have traditionally used combination locks for controlling and authorizing entry. Locks had been mechanical and relied on a person dialing a correct combination on a rotating dial. The rotation positioned mechanical elements within the lock such that dialing the correct combination allowed a locking bolt to release the container door. For example, traditional mechanical locks, such as Gartner, U.S. Pat. No. 3,968,667 (1976), rely on a dial rotating tumblers. Proper dial rotation aligns gates in the tumblers. Once the gates are aligned, a fence on a fence lever can enter the aligned gates. Continued rotation of the dial and tumblers pulls the fence lever and withdraws the bolt.

Electronics have replaced mechanical structures in many locks. Electronic locks can use electronics rather than aligned tumbler wheels to sense entry of the correct combination. The electronics can sense the rotary position of a combination lock dial, or a key pad can replace the combination dial. Consequently, instead of dialing a number, e.g., 72, the user would first push the "7" and then the "2" keys for the same result. Uyeda, U.S. Pat. No. 5,134,870 (1992) and Gartner, U.S. Pat. No. 5,136,870 (1992) are examples of a key pad entry system for a safe and door lock, respectively.

When the lock is used to secure entry to a container, the electronic components are mounted on a housing inside the container door. The housing contains a battery and a circuit board, which contains the electronic circuitry controlling the lock. The key pad is on the outside of the housing to be accessible to the user. Therefore, a cable must extend between the key pad and the circuit board for transmitting signals between the two components. Additionally, the battery must be secured, and wires must connect the battery to the circuit board.

Batteries power most electronic locks. One could mount the battery within the safe or container. If the battery fails, however, the lock is inoperative, rendering it impossible to use the lock to access the inside of the container. Therefore, mounting the battery in the key pad housing and making the battery accessible without having to open the safe is desirable.

The key pad is on the outside of the key pad housing, but the circuitry is within the housing. Therefore, the cable that carries signals from the keys must extend through a wall of the key pad housing from the key pad to the circuit board. During assembly and use, the cable can separate from the circuit board. Cable bending can also cause a break in one of the conductors in the cable.

Traditionally, the key pad is parallel to the safe or container wall. Thus, it usually is in a vertical plane. Often, the user's eyes are higher than the key pad so he or she looks down and at an angle to it. Accordingly, having a flat key pad with its surface parallel to the door may make the key pad more difficult to see.

INVENTION SUMMARY

One object of the present invention is to disclose and provide a key pad housing in which the external parts such as the key pad connect to the internal parts and circuitry securely. Another object of the present invention is the disclosure and provision of a key pad housing with an angled face that can be seen when the eye level is above the key pad. Another object is to disclose and provide a way of securing a battery that powers the internal circuitry and yet is accessible for replacement.

These and other objects of the present invention will be apparent with the drawings and the detailed explanation of the exemplary embodiments.

The key pad assembly of the present invention includes a housing that attaches to a secure container. The housing has a front wall, and a key pad attaches to the front or outside face of the front wall. A generally cylindrical side wall extends back from the front wall. The side wall is truncated at an angle so that as the edge of the side wall seals against a safe or container door, the front face of the key pad housing is at an angle to the door. Where the side wall is widest, the side wall has a removable section through which a battery can be inserted.

A cable extends through an opening in the front face from the key pad to a circuit board that mounts the combination sensing circuit. The cable is flat with multiple electric conductors through it. The cable also has a slot. When the key pad and circuit board are properly assembled, the slot in the cable fits over a pin extending from the rear face of the front wall of the housing. The pin secures the cable so that it is not pulled from its connection with the key pad or the circuit board. Other pins within the housing mount the circuit board.

Parallel walls from the rear of the front face create a cavity for the battery. Small walls near the bottom of the battery chamber support the bottom of the battery. Each of the side walls that create the battery chamber has a shaft with an opening that extends through the front wall. The shafts supply support for bolts attaching the housing to the secure container. The key pad covers those openings.

DETAILED DESCRIPTION OF THE PREFERRED EMBODIMENTS

Figure 1:
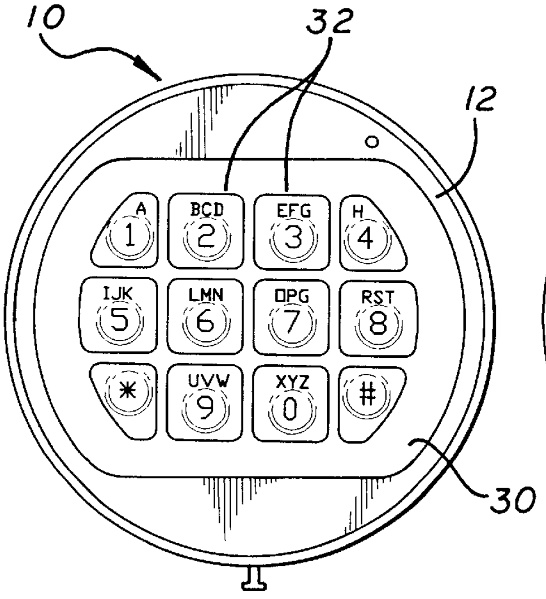
FIG. 1 is a front view of the key pad assembly of the present invention.

The key pad assembly of the present invention comprises a housing 10. It normally will be metal, such as brass or stainless steel. The outside may be chrome-plated, or the unplated metal surface can be polished or brushed for aesthetics. Casting is a preferred way of forming the housing.

Housing 10 has a front wall 12 (FIGS. 1 and 6) and a side wall 20. In the exemplary embodiment, the side wall is generally cylindrical. The cylindrical wall is truncated at an angle as best shown in FIGS. 3, 4, 7 and 8. The truncation along edge 22 means that the bottom of the side wall is wider than its top. The front wall may also have a chamfer or rounded surface 24 between the front wall and the side wall to avert a sharp edge at the intersection of the walls.

Figure 6:
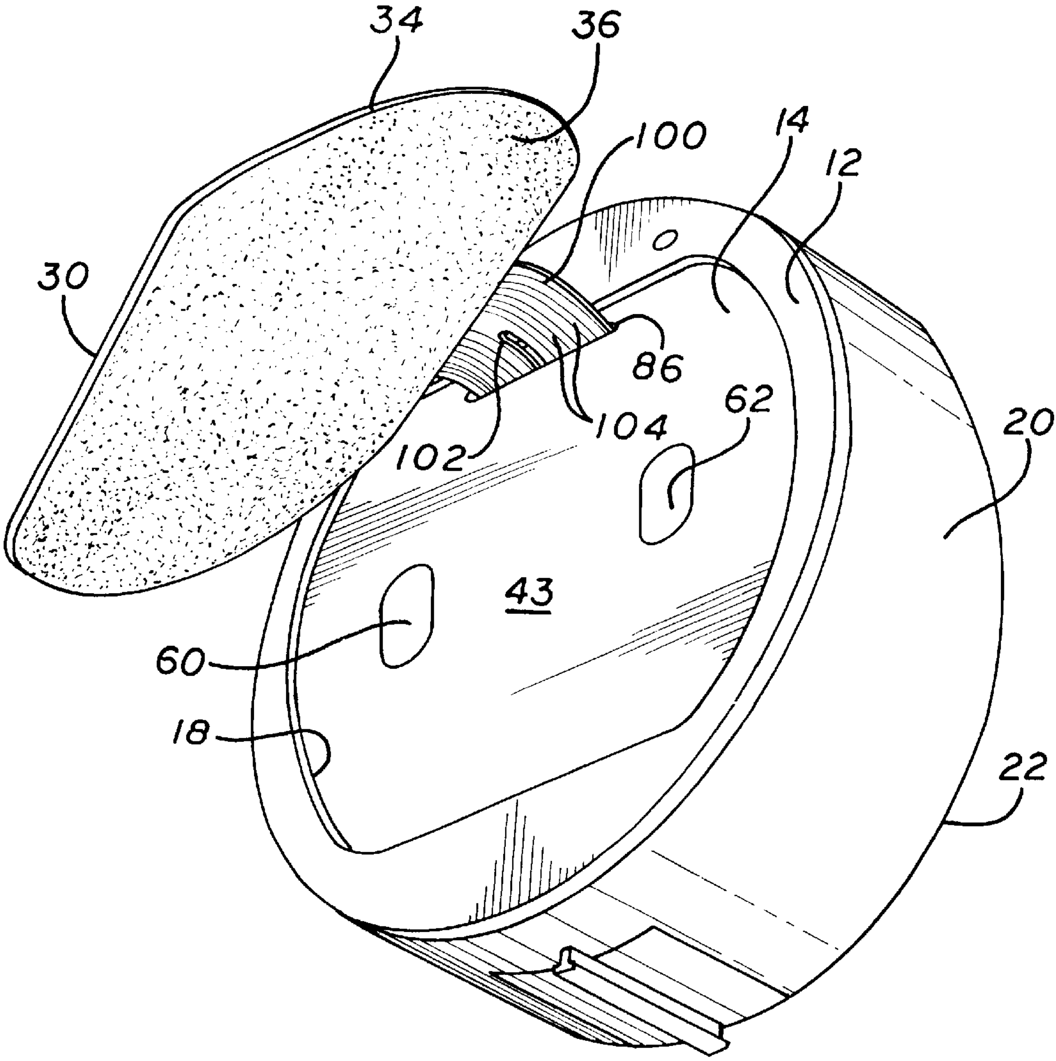
FIG. 6 is a perspective view of the key pad assembly of the present invention showing the key pad before it is attached to the housing.

The front face has an indented portion 14 (FIG. 6). In the exemplary embodiment, the indented portion is formed by creating an opening 18 (FIG. 6). A plate 42 (FIG. 2) is welded to the rear face 44 of front wall 12. The front face 43 of plate 42 rests against the rear face 44. Consequently, it creates an indentation equal to the thickness of front wall 12. Alternatively, the indentation can be formed to an existing casting during the casting process or through a metal milling or deforming process.

Figure 8:
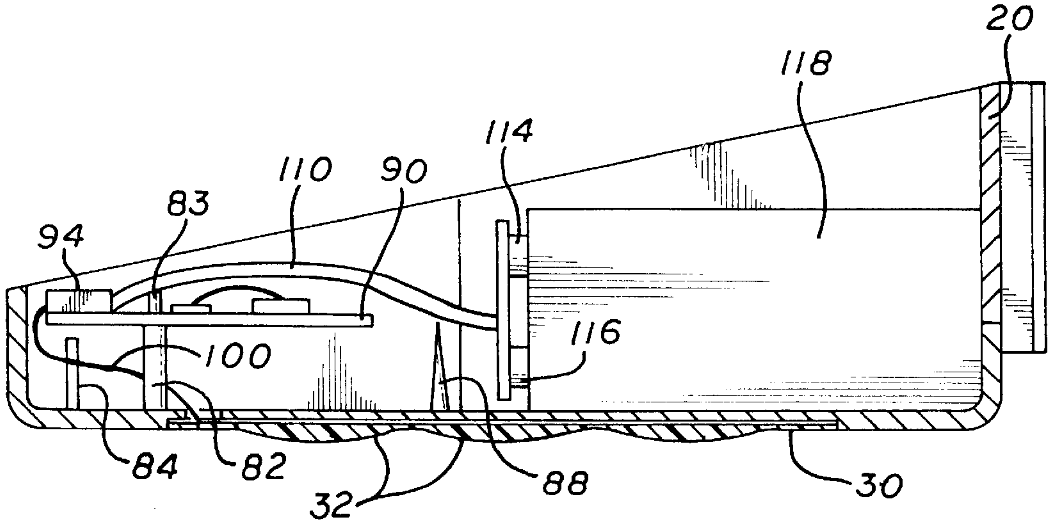
FIG. 8 is a side, sectional view of the key pad assembly of the present invention.

A key pad 30 attaches to the front or outside of front wall 12 (FIGS. 1, 6 and 8). The key pad in the exemplary embodiment has 12 keys 32 with the numbers 0 through 9, #*. As (FIG. 1 shows, letters can also be associated with the numbers. The exemplary embodiment uses a different letter pattern than a telephone, but the letters that correspond with the numbers can be in any desired pattern. The keys 32 are laid out as shown in FIG. 1 with larger buttons for the 5 and 8 keys than for the 1, 4, * and # keys so that the keys along the side curve aesthetically with the curvature of the housing side wall. If housing 10 were square, the key pad likely would be square or rectangular.

Each key 32 is sealed and covered with flexible material. Depressing a key makes electrical contact within the key.

A cable 100, which carries conductors 104, attaches to the top of the key pad 30. In the exemplary embodiment, seven conductors are on each side of the cable. Six of those conductors connect to one of the keys, and the seventh conductor connects to the grounds of six keys.

During assembly, the assembler feeds cable 100 through opening 86 in front wall 12 (FIG. 6). The opening 86 is sized to receive the cable. The surface 34 of the key pad 30 has an adhesive backing 36. The assembler removes a protective sheet (not shown) over the adhesive backing and affixes the key pad 30 to the front face 12 within indentation 18.

Figure 5:
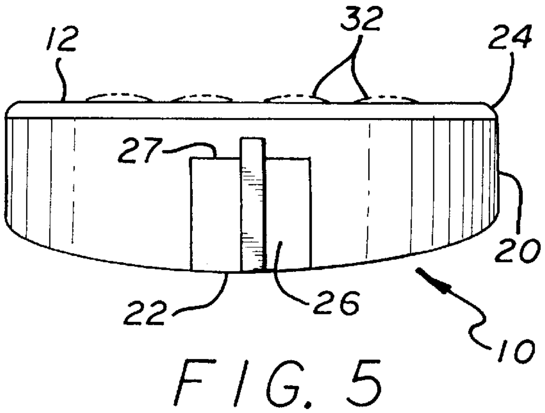
FIG. 5 is a bottom view of the key pad assembly of the present invention.

Two parallel battery walls 52 and 54 (FIGS. 2, 4 and 7) extend upward from the bottom of side wall 20 and from plate 42. In the exemplary embodiment, walls 52 and 54 are sufficiently spaced to hold a 9 volt battery 118. Walls 52 and 54 taper at 53 and 55, respectively. A rounded wall 26 (FIGS. 2, 4 and 7) fits between the two tapers 53 and 53. That wall is removable to allow access to the space between walls 52 and 54. The opening into which wall 26 slides does not extend the entire height of the side wall as FIG. 5 shows. The short walls 68 and 70 project upward from the front wall approximately to the base 27 of wall 26 (FIG. 5). When battery 118 is inserted into the opening between walls 52 and 54, it can slide along short walls 68 and 70 until it reaches the ends of the short wall. It is then pushed toward the back of front wall 12 where it rests on the tops of the short walls. Pin 88 (FIGS. 2 and 8) block the battery from being pushed too far into the housing.

Figure 2:
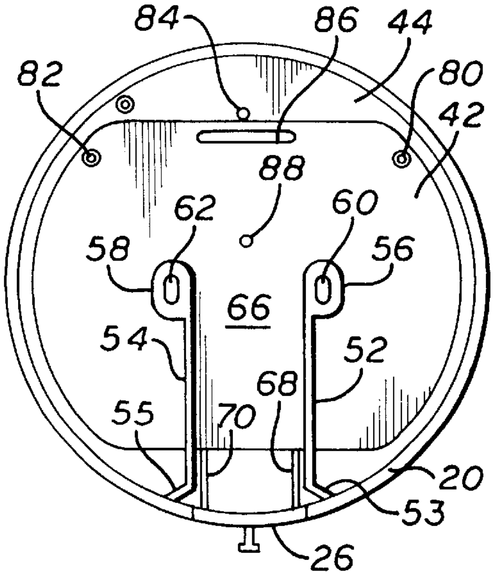
FIG. 2 is a rear view of the key pad assembly of the present invention.
Figure 3:
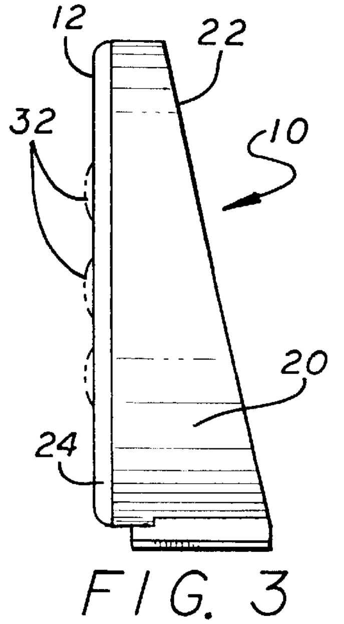
FIG. 3 is a side view of the key pad assembly of the present invention.
Figure 4:
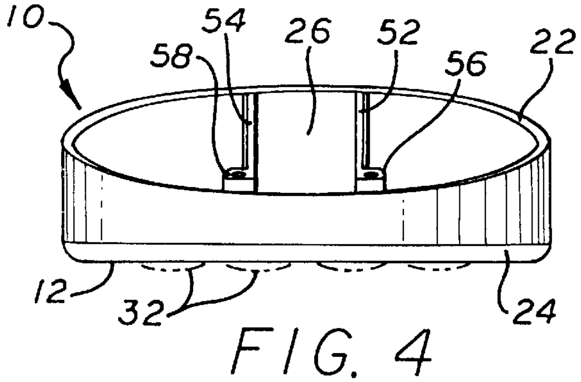
FIG. 4 is a top view of the key pad assembly of the present invention.
Figure 7:
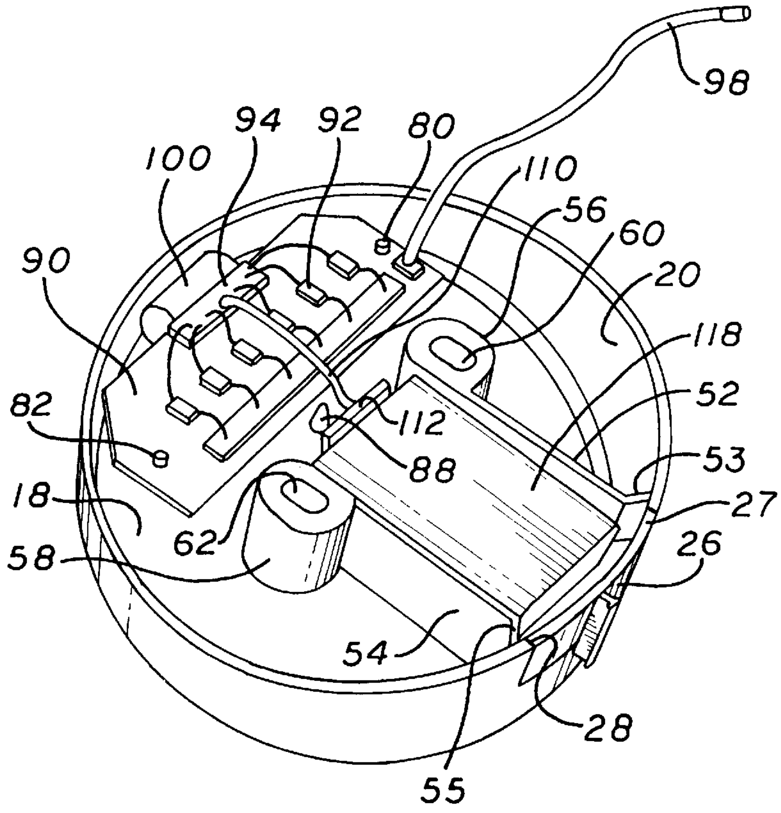
FIG. 7 is a rear perspective view of the key pad assembly of the present invention and shows the mounting of the battery and circuit board.

A pair of shafts 56 and 58 are integral with the tops of walls 52 and 54 (FIGS. 2 and 7). The shafts have openings 60 and 62 that extend through front wall 12. See FIG. 6.

Pins 80 and 82 also project upward from the rear of front wall 14. As best shown in FIG. 8, pin 82 has a smaller diameter portion 83. Where that portion intersects the main part of pin 82, a shoulder is formed. A circuit board 90 has two openings that align with pins 80 and 82 (FIG. 7). The circuit board openings receive the pins, and the board rests on the shoulders of the pins. An adhesive at the pin/board interface is optional. The circuit board has circuit elements 92 and a connector 94. Cable 100 from the key pad plugs into the connector as FIG. 7 shows. A second cable 98 attaches to circuit board 90. It receives a signal from circuit elements 92 in response to the user depressing keys 82. The cable transmits a signal to lock elements (not shown) within or on the outside of the container door. The container door has an opening for receiving cable 98.

Electrical power from battery 118 is transmitted to a battery clip 112 that attaches to poles 114 and 116 of the battery. Wires within conduit 110 carry current to the circuit board (FIG. 8). Conduit must be long enough that one replacing the battery 118 through opening 26 can remove the old battery from and attach a new battery to the clip 112.

The key pad components are assembled as follows. The assembler places the key pad in the orientation shown in FIG. 6 with cable 100 passing through opening 86. Cable 100 has a slot 102 (FIG. 6). That slot is placed over pin 84 (FIG. 8). Doing so leaves slack in cable 100 and prevents the installer from pulling the cable out of the connector 94. Cable 100 is then plugged into connector 94 and the circuit board 90 is secured onto pins 80 and 82 An adhesive may be applied at those pins to secure the circuit board.

Battery clip 112 is attached to battery 118, and the battery is inserted between walls 52 and 54. Cable 98 (FIG. 8) also is attached to the locking and unlocking device in the container door.

Before the key pad is attached to the housing, the installer bolts the housing through openings 62 and 62 to the door of the safe. With the housing secured, the backing is removed from the adhesive 36 on the key pad, and the key pad is then attached to the surface 43 of front wall 12 within indentation 18.

An assembler can perform many of these assembly steps in different orders.

While the specification describes particular embodiments of the present invention, those of ordinary skill can devise variations of the present invention without departing from the inventive concept.

We claim:

1. A key paid assembly comprising:

a housing attachable to a secure container, the housing having a front wall with a front facing outside of the housing and a rear face facing inside the housing, a side wall extending away from the front wall, the housing further having an inside behind the front wall;

a key pad attachable to the front face of the front wall of the housing, the key pad having a plurality of keys, each key sending a signal to a sensing circuit when the key is pressed;

a cable containing a plurality of conductors, the cable extending from the key pad and being attachable to the sensing circuit; the sensing circuit being mounted on a circuit board inside the housing;

a cable opening through the front face from the outside to the inside, the cable passing through the cable opening into the housing;

a slot through the cable on a portion of the cable spaced from the key pad and from the sensing circuit; and a pin on the inside of the housing positioned to engage the slot of the cable to limit movement of the cable and at least two openings through the front face and a shaft extending around the openings through the front face and a shaft extending around the openings, a battery container within the housing for receiving a battery the battery container comprising a pair of battery walls extending from the front wall of and spaced to receive a battery and a battery opening in the side wall adjacent to the battery container of sufficient size to allow insertion and removal of the battery through the battery opening, each shaft being attached to one of the side walls of the battery container.

2. A key pad assembly comprising:

a housing attachable to a secure container, the housing having a front wall with a front face facing outside of the housing and a rear face facing inside the housing, a side wall extending away from the front wall, the housing further having an inside behind the front wall;

a key pad attachable to the front face of the front wall of the housing, the key pad having a plurality of keys, each key sending a signal to a sensing circuit when the key is pressed;

a cable containing a plurality of conductors, the cable extending from the key pad and being attachable to the sensing circuit; the sensing circuit being mounted on a circuit board inside the housing;

a slot through the cable on a portion of the cable spaced from the key pad and from the sensing circuit; and a pin on the inside of the housing positioned to engage the slot of the cable to limit movement of the cable, wherein the pin fixedly mounts in the housing.

3. The key pad assembly of claim 2 wherein the pin mounts to the rear face of the front wall.

4. The key pad assembly of claim 3 wherein the pin intersects the rear face generally perpendicularly.

5. The key pad assembly of claim 2 wherein the pin is integral to the rear face of the front wall.

6. The key pad assembly of claim 2 wherein the pin is open at its top, the slot through the cable being insertable and removable over the open end of the pin.

7. The key pad assembly of claim 1 wherein the shafts are integral with the battery walls.

8. A method of assembling a key pad housing wherein the housing has a front wall with a front face facing outside of the housing and a rear face facing inside the housing, the method comprising the steps of:

passing a cable attached to a key pad through an opening through the front wall, the cable having a free end and an end attached to the key pad;

attaching the free end of the cable to a circuit board and mounting the circuit board to the rear face of the front wall;

securing the cable to the front wall by placing a slot in the cable over a pin on the rear face of the front wall wherein the slot is loose on the pin;

attaching the housing to a safe or other secure container by means of fasteners extending through openings in the front wall; and attaching the key pad to the front face of the front wall over the openings in the front wall, wherein the slot is loose on the pin.

* * * * *